March 5, 1940.    W. L. CLOUSE    2,192,734
CONTROL MECHANISM FOR FORGING MACHINES
Filed Feb. 18, 1936    2 Sheets-Sheet 1

Inventor
WILLIAM L. CLOUSE
By Richey & Watts
Attorneys

March 5, 1940.　　　W. L. CLOUSE　　　2,192,734
CONTROL MECHANISM FOR FORGING MACHINES
Filed Feb. 18, 1936　　　2 Sheets-Sheet 2

Inventor
WILLIAM L. CLOUSE
By Richey & Watts
Attorneys

Patented Mar. 5, 1940

2,192,734

UNITED STATES PATENT OFFICE 2,192,734

CONTROL MECHANISM FOR FORGING MACHINES

William L. Clouse, Tiffin, Ohio, assignor to The National Machinery Company, Tiffin, Ohio, a corporation of Ohio Application February 18, 1936, Serial No. 64,530

14 Claims. (Cl. 192—144)

This invention relates to heavy duty presses, forging machines and the like and more particularly to a clutch and brake assembly for such machines, and a control mechanism therefor.

Friction clutches, particularly fluid pressure operated friction clutches have a number of advantages in a forging machine such as smooth engagement, rapid action, and slippage under overload. Any slippage in a friction clutch, however, adversely effects the frictional material employed to line the clutch engaging parts, causing the material to become glazed, excessively heated, and rapidly worn. Numerous failures in and the short life of clutches of this type are largely caused by excessive slippage. Excessive wear in the clutch faces takes place, for instance, when the clutch is engaged prior to a complete release of the brake means employed to restrain machine movement. In the event that the brake is partially applied prior to complete clutch disengagement an additional load is placed upon the clutch faces and rapid wear results.

It is among the objects of my invention to provide a control mechanism for a clutch and brake assembly on a forging machine that will automatically insure complete brake disengagement prior to clutch engagement and automatically insure complete clutch disengagement prior to brake engagement. A further object of my invention is to provide a control means which is actuated in timed relation to the movements on the header slide of the forging machine, which will admit air under pressure to effect brake disengagement, thereafter effect a clutch engagement and maintain said clutch engagement until a time just prior to the end of the forging machine cycle, and which will disengage said clutch and engage said brake at the termination of the forging machine cycle. A further object of my invention is to provide a control mechanism in a forging machine clutch and brake assembly which will prevent simultaneous clutch and brake engagement. A further object of my invention is to provide a method of controlling a clutch and brake assembly for a forging machine, wherein a single treadle actuation by the forging machine operator will initiate a series of events comprising successive brake disengagement, clutch engagement, clutch disengagement and brake engagement, and insure that there be no injurious overlapping of said clutch and brake actions throughout the forging machine cycle.

Additional objects and advantages relating to simplicity, economies of manufacture and long life of clutch and brake friction materials will appear from the following description and the accompanying drawings wherein.

Figures 1, 2:
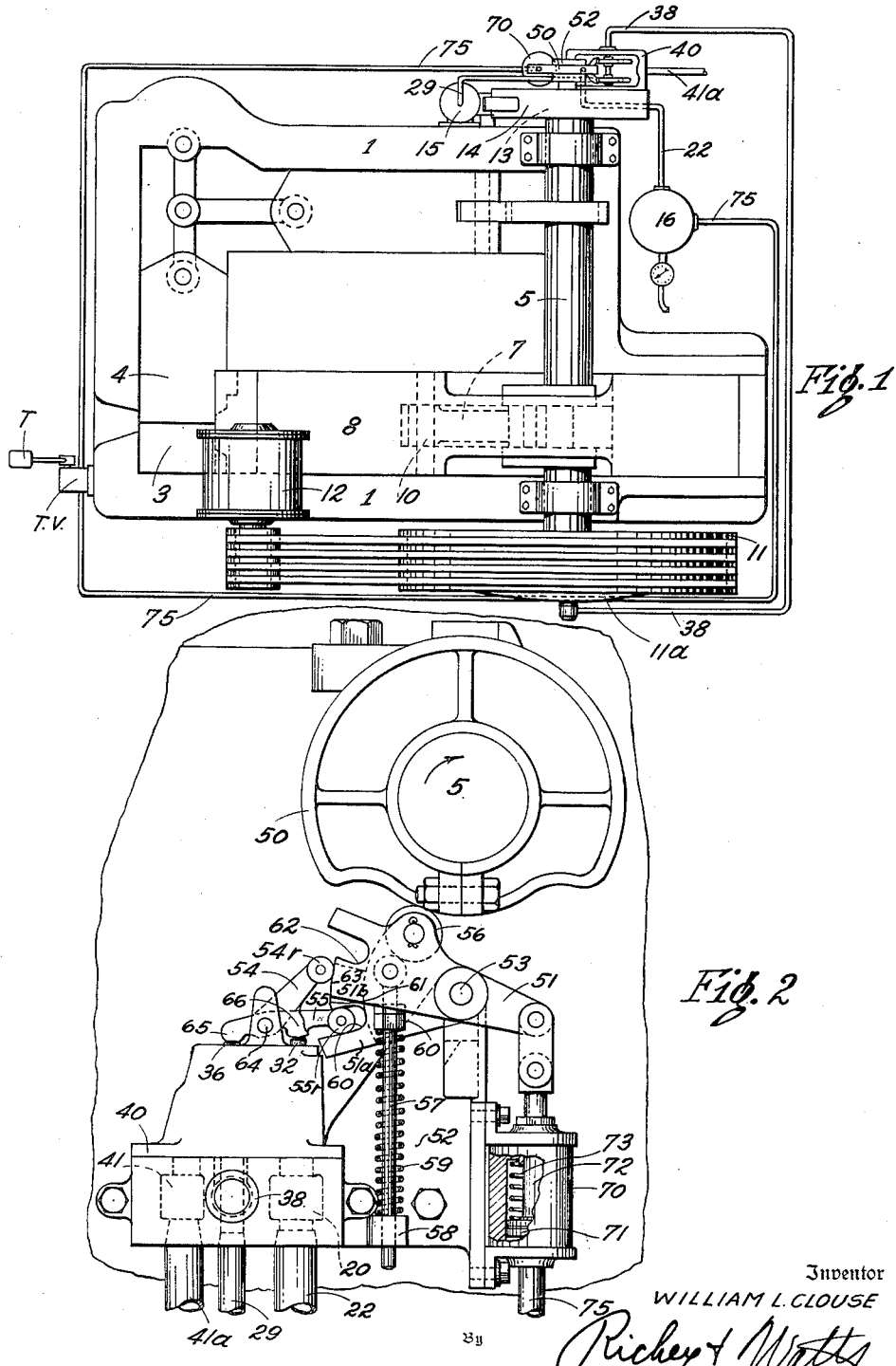
Figure 1 is a plan view of a forging machine provided with a clutch and brake assembly constructed according to my invention.
Figure 2 is an elevation of the clutch and brake control mechanism constructed according to my invention.
Figure 3:
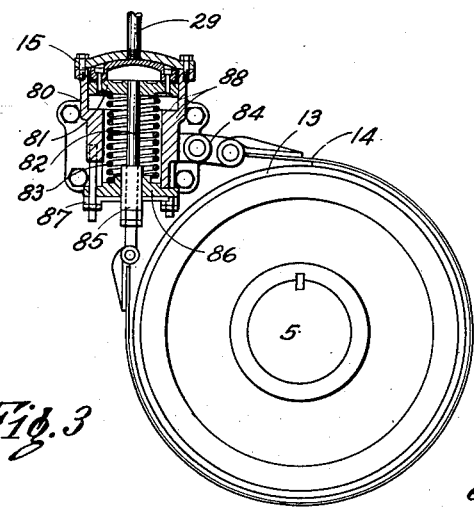
Figure 3 is a transverse sectional showing of a brake employed in my clutch and brake assembly.

I have attained the objects and advantages outlined above by providing a treadle actuable by the operator of the machine to apply fluid pressure to a cylinder beneath a piston therein and rock a valve actuating arm, first, to open a valve leading to a brake and release the same; secondly, at a timed interval thereafter open a valve leading to a clutch to engage the same. Thereafter a cam moving in timed relation to the header slide of the forging machine holds the clutch fluid pressure valve open to maintain clutch pressure until the forging machine cycle is substantially completed, said cam functioning near the completion of the cycle to relieve the fluid pressure in the clutch and apply the brake at the termination of the forging machine cycle.

Although the embodiment of my invention herein described in considerable detail is especially adapted for the use of air under pressure, the invention in its broader aspects covers other fluid actuating mediums such as oil, water or other liquids. From the following description it will also be understood that the disclosed method of coordinating clutch and brake mechanism is suited to various types of clutches and brakes. Accordingly the term fluid pressure as used herein is intended to include liquid means even though the apparatus shown would require some modification to better adapt the apparatus to the actuating medium employed.

In the illustrated embodiment of my clutch and brake assembly, a forging machine having a bed frame 1 and a crankshaft 5 extending transversely thereof is provided with a header slide 8 mounted upon guideways formed in the bed frame. The header slide is preferably provided with bearings in the bed frame on each side of the crankshaft and is reciprocated in the bed frame by a connecting rod 7 pivoted at 10 to the header slide and to an offset crank portion on the crankshaft 5. The bed frame may be provided with a stationary die part 3 and movable die part 4 actuated by a toggle mechanism in the usual manner. The crankshaft 5 in the illustrated embodiment is extended beyond the bed frame at one side of the machine and has mounted thereon a clutch and flywheel assembly 11—11a wherein the flywheel is rotatably mounted on the shaft and the clutch is provided with driven plates splined to the shaft, preferably constructed as shown in my copending application, Serial No. 31,251, filed July 13, 1935. A motor 12 is mounted on the bed frame or other support adjacent the flywheel and through belt means drives the forging machine through the flywheel 11 and clutch 11a. The other end of the crankshaft in this embodiment is projected beyond the bed frame at the other side thereof as at 52 and is preferably provided thereat with a brake drum 13 surrounded by a brake band 14 operatively connected to an air brake mechanism indicated generally at 15.

An air tank 16 is connected through suitable conduits to the brake and clutch valve control block indicated generally at 40 arranged beneath the projecting end of the crankshaft 52. The air tank 16 may be supplied with air from an air line or from a pump operated by the forging machine and through relief valves mounted thereon is arranged to maintain air at a constant pressure.

Figure 4:
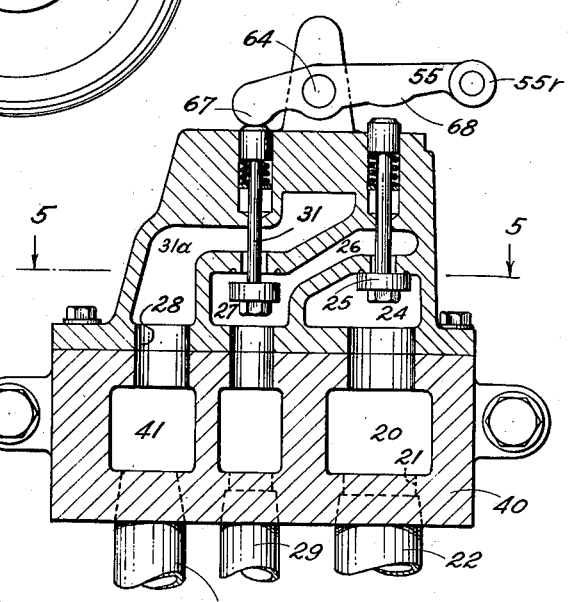
Figure 4 is a transverse sectional view of the valve chamber and valves employed to conduct air to and from the brake.
Figure 5:
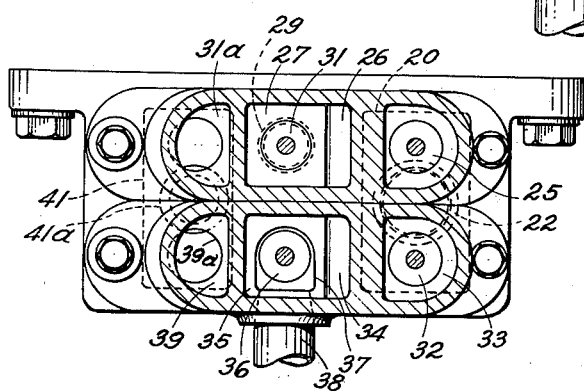
Figure 5 is a sectional plan view taken along the line 5—5 of Figure 4.

To conduct the air at timed intervals to the clutch and brake, the block 40 (see Figures 4 and 5) is provided with an inlet chamber 20 at the lower side thereof having an aperture 21 in its lower wall which communicates through pipe 22 with the air tank 16. An opening 23 in the upper wall of said chamber 20 leads to a valve chamber 24 having a valve 25 positioned in the upper wall or ceiling thereof. A passage 26 leads laterally from said valve 25 into a second valve chamber 27 provided with an aperture 28 leading through a conduit 29 to the brake mechanism 15. From this it will be observed that when valve 25 is moved to an open position; that is, to pass air from chamber 24 upwardly into passage 26 and the valve 31 in chamber 27 is closed that air from the tank 16 will be directed to the brake 15 and functions therein to disengage the brake.

Through a valve actuating means to be more fully described hereinafter the air from the pressure tank is directed into the brake 15 and maintains the same disengaged through substantially a single complete cycle of the forging machine. Subsequent to the brake disengagement said valve actuating means becomes effective to open a valve 32 which is arranged in a chamber 33 positioned above and in communication with the inlet chamber 20. Air under pressure moves through the valve 33 into a transverse passage 34 which corresponds in contour and arrangement to the chamber 26 referred to in connection with the description of the brake. The transverse passage 34 terminates in a valve chamber 35 having an exhaust valve 36 positioned in its upper wall and an opening 37 leading to the clutch in its lower wall. Air under pressure conducted through the chamber 34 is directed downwardly through the aperture 37 and through the pipe 38 connected therebeneath to the clutch 11a. The valve actuating means maintains the clutch exhaust valve 36 positioned in the upper wall of the chamber 35 closed throughout substantially a complete cycle of the forging machine.

Immediately prior to the termination of the forging machine cycle; that is, at the time the header slide reaches "back center" or starting position, the valve actuating means closes the valve 32 to prevent the passage of air from the pressure tank into chamber 35 and opens the valve 36 in the upper wall of said chamber to conduct air from said chamber and said clutch to a clutch exhaust chamber 39. The lower wall of the clutch exhaust chamber is apertured as at 39a and the air from said exhaust chamber is admitted to a main exhaust chamber 41 which extends transversely beneath the clutch and brake exhaust valves and opens to atmosphere through exhaust pipe 41a. Subsequent to the disengagement of the clutch 11a by exhaustion of the air therein, the valve 25 which throughout the major part of the forging machine cycle has been maintained opened to direct air to the brake cylinder is closed and the brake exhaust valve 31 arranged in the upper wall of the chamber 27 is opened to exhaust the air from said chamber and from the brake 15. The brake is applied by the exhaustion of the air therefrom and the exhausted air released through valve 31 is moved laterally and downwardly through a chamber 31a in direct communication with the main exhaust chamber 41.

To actuate the valves in sequence and in timed relation to the header slide movements, a cam 50 is secured to a projecting end of the crankshaft 5 or other shaft moving in timed relation to shaft 5 and is arranged to cooperate with a series of levers and rollers operatively connected to the valve and chamber unit above described. A bracket 52 integrally formed with or secured to the chambered valve block 40 supports through pivot 53 a lever 51 having cam surfaces and notches thereon operatively connected with the rocker arms 54 and 55 positioned to actuate the valves. The lever 51 pivotally supports a roller 56 arranged to bear against the cam 50 carried by the crankshaft and to urge the lever 51 upwardly a rod or link 57 is pivoted thereto and extends downwardly to have a free sliding fit through an aperture 58 formed in a ledge of the bracket 52. A coil spring 59 surrounds the rod 57 and one end of said spring bears against said ledge and the other end against tension adjusting means 60 mounted on the rod 57 whereby the roller 56 is normally urged into engagement with the outer periphery of the cam 50.

To initiate the movement of the lever 51 an air operated treadle cylinder 70 is secured to the bracket 52 and contains a plunger 71 having a connecting rod 72 operatively connected to one end of the lever 51. A coil spring is arranged about the connecting rod 72 and normally urges the piston to the lower limit of its movement within the cylinder 70. Air is admitted into the treadle cylinder 70 beneath the plunger 71 through the conduit 75 which leads through a treadle valve controlled by the machine operator to the air pressure tank. Actuation of the treadle T by the operator opens the conduit 75 to air passage from the tank and effects an upward movement of the plunger 71 within the cylinder 70. The treadle valve T. V. (through means not shown) is arranged to vent the air from the cylinder 70 upon being released by the machine operator.

The transmission of the movements of lever 51 to the valves is effected through rocker arms 54 and 55 pivotally mounted upon a supporting shaft 64 extending transversely of the chambered valve block 40 and each of said rocker arms is provided on its under surfaces at each side of said pivotal support with valve tappets 65 to 68 inclusive. The outermost rocker arm 54 may be referred to as the clutch valve rocker arm inasmuch as it controls through tappets 65 and 66 the clutch actuation and the innermost rocker arm 55 may be referred to as the brake valve rocker arm. The lever 51 in this embodiment is provided with laterally offset portions 51a and 51b to engage rocker arms 55 and 54 respectively which are spaced along the supporting shaft 64. A notch 60 is formed in the portion 51a to receive a roller 55r on the outer end of the rocker arm 55 and a notch 62 is formed in the portion 51b to cooperate in a similar manner to receive the outer end of rocker arm 54. Cam surfaces 61 and 63 are formed adjacent said notches to cooperate with the respective notches and rollers 54r—55r to position the rocker arms.

Upon actuation of the treadle T by the operator, it will be observed (see Figure 2) that upward movement of the plunger 71 within the cylinder 70 effects a downward movement of the notched end of the lever 51 against the urging of the spring 59. The notch 60 during the first part of this movement carries the brake rocker arm 55 downwardly and through the valve tappet 68 carried by said arm opens valve 25 which admits air from the air pressure inlet chamber 20 into the brake 15 to effect disengagement of the brake. During the preliminary movement of the lever 51 the clutch rocker arm 54 is maintained in a fixed position by reason of its roller 54r bearing on cam surface 63 and it is only near the termination of the tilting movement of lever 51 that the outer end of the clutch rocker arm 54 enters notch 62.

The above described delayed action between the brake rocker arm and the clutch rocker arm insures a disengagement of the brake prior to an engagement of the clutch which is effected by a continued turning of the lever 51. During said continued turning and at the termination of the tilting of lever 51 the clutch rocker arm 54 is moved to effect through the valve tappet 66 thereon an opening of the valve 32. The air under pressure admitted through valve 32 and passage 34 into the clutch 11a completes a clutch engaging actuation which initiates the rotation of the crank 5 and consequently the cam 50 carried thereby. Rotation of the cam maintains the lever 51 in a depressed position against the action of spring 59 on one side and the action of spring 73 in the treadle cylinder on the other side.

Since crankshaft rotation through the cam 50 thus relieves the treadle cylinder of any further part in the valve actuation, the treadle may be disengaged by the operator subsequent to its depression to vent the cylinder 70 and the forging machine will continue throughout its cycle. During the major part of the forging machine cycle the lever 51 is maintained in its lower or depressed position by the cam 50 and the brake rocker arm 55 during this period is maintained on the cam surface 61 to effect a brake disengagement. As the lever arm 51 is permitted to move upwardly toward the end of the forging machine cycle (as will be determined by the contour of cam 50) a reversal of the timed relation of clutch and brake actuation takes place. Whereas the cams and notches on the lever 51 are contoured to disengage the brake and actuate the clutch in sequence as the lever moves downwardly, upward movement first disengages the clutch and then applies the brake. As the lever 51 rocks upwardly, the roller 54r on the clutch rocker arm 54 is moved outwardly on to the cam surface 63 to effect a closing of the valve 32 and an opening through tappet 65 of the valve 36 to exhaust the air from the clutch 11a. Subsequent to clutch rocker arm actuation the roller 55r of the brake rocker arm 55 moves off of the cam surface 61 and drops into the notch 60 to effect a closing of the valve 25 and an opening of the valve 31 to exhaust the air from the brake cylinder to apply the brake. The rocker arms are preferably shaped to insure that the exhaust valve is open when the air valve is closed and thus provide that any leakage in the air valve is ineffective to actuate the clutch or disengage the brake.

From the foregoing description of valves and actuating means therefor, it will be seen that an actuation of the treadle T by the machine operator will initiate through treadle cylinder 70 a series of events in which the lever 51 is tilted to release the brake 15, apply the clutch 11a, rotate the crankshaft 5 through substantially 360° and release the clutch and apply the brake toward the completion of said 360° movement.

The brake mechanism generally identified at 15 comprises a cylinder 80 having a piston 81 positioned therein and a connecting rod 82 arranged to transmit directly the piston movements to the brake band 14. A spring 83 is positioned to surround the connecting rod 82 and normally urge the piston to its upward limit within the cylinder. The brake band 14 is anchored at one end through link 84 to the brake cylinder block and is positioned to surround the brake drum 13 and be connected through adjusting device 85 to the piston rod 82. The spring 83 within the brake cylinder 80 is proportioned to move the piston upwardly and apply the brake upon the exhaustion of air from the cylinder above the piston.

In a brake constructed according to my invention massive levers and other actuating parts which might through their inertia retard the brake action are dispensed with to provide a quick acting positive brake. Upon venting of the air in the brake cylinder 80 the spring has only to overcome the inertia of the piston and the piston rods to draw the brake band tightly about the drum 13. Preferably the band 14 is wrapped about the drum 13 to effect a self-energizing of the brake and said self-energizing effect supplements the action of the spring to quickly and positively "snap" the band into a braking position. In the combination with a forging machine having a cycle of movement as outlined in the preceding paragraphs the brake drum 13 is stationary at the time of brake release and thus the self-energizing effect of the brake cannot retard the releasing action of the brake. The admission of air into the cylinder 80 overcomes the compression of the spring 83 and quickly forces the piston 81 and rod 82 downwardly to release the brake band 14. The plunger or piston may be limited in said downward movement within the cylinder 80 by an abutment shoulder 88 formed within the cylinder or by the compression of the spring 83. The spring 83 surrounding the piston rod 82 is supported within the cylinder upon a shouldered disc 86 and said disc in turn is supported by adjusting devices 87 depending from the cylinder wall. Through the adjustment of means 87 disposed beneath the disc 86 the tension of the spring 83 may be adjusted and thus the action of the brake band 14 may be controlled within certain limits by spring adjustment. The adjustment between the brake band 14 and the piston rod as at 85 is preferably arranged to limit the upward movement of the piston and prevent violent bottoming of the same against the cylinder head.

From the foregoing description it will be observed that I have provided a clutch and brake assembly wherein the clutch and brake are automatically controlled in a manner which prevents clutch actuation when the brake is engaged and prevents the application of the brake while the clutch is engaged. Said automatic means provides for a rapid smooth and positive engagement of both clutch and brake without any injurious overlapping in their action so as to insure a long life of the clutch and brake parts and a safe and efficient operation of the forging machine. While I have illustrated and described an embodiment of my invention in some detail, I wish to be limited neither to the embodiment shown nor the details thereof, since many departures therefrom may be made without departing from the spirit of the invention.

I claim:

1. In a machine having a reciprocating header slide, a clutch to transmit motion to said slide and a brake to restrain movement of said slide, a control assembly operating in timed relation to said header slide movement and connected to said clutch and brake comprising means moving prior to the initiation of the header slide reciprocation to release said brake, means moving immediately subsequent to said brake release to effect clutch engagement, means moving in timed relation to said header slide reciprocation to maintain said clutch engagement substantially throughout a cycle of the machine and cooperating with said first named means to re-engage said brake at the completion of said cycle.

2. In a machine provided with a reciprocating header slide, a clutch arranged to transmit motion to said header slide, and a brake to restrain the movement of said header slide, a control assembly operating in timed relation to header slide movement comprising means to disengage said brake prior to clutch engagement, means automatically engaging and maintaining clutch engagement subsequent to brake release, and means automatically disengaging said clutch and re-applying said brake means at the completion of the machine cycle, said means cooperating to establish the action of the clutch or brake exclusively whereby overlapping of their functions is eliminated.

3. In a machine having a reciprocating header slide and a shaft provided with eccentric means to reciprocate the header slide upon shaft rotation, a flywheel rotatably mounted upon said shaft and an air operated friction clutch arranged intermediate said flywheel and shaft to rotate said shaft upon clutch actuation, an air operated friction brake operatively connected to said shaft to restrain shaft rotation, an air pressure supply, a control assembly operating in timed relation to said shaft and header slide operatively connected to said clutch and brake, conduits connecting said air supply, control assembly, clutch and brake, valve means responsive to manual actuation by the machine operator to admit air from said supply to said brake to effect a release of same and to initiate clutch engagement and effect shaft rotation, means responsive to shaft rotation to automatically maintain said clutch engagement during the major portion of the machine cycle and close said valve means to disengage said clutch near the end of said machine cycle, and to automatically apply said brake immediately subsequent to said automatic clutch disengagement.

4. In combination, a machine having a reciprocating header slide and a crankshaft to actuate same, a prime mover, an air clutch arranged intermediate said prime mover and said shaft to transmit movement therebetween, an air brake operatively connected to said shaft, an air supply, a control assembly for said clutch and brake comprising conduits interconnecting said air supply clutch and brake, a plurality of valves in said conduits intermediate said air supply and said clutch and said brake, means operatively connected to said shaft and to said valves, means operatively connected to said first named means and responsive to manual actuation by the machine operator to successively actuate said valves whereby air from said supply is directed to said brake to release same, air is directed from said supply to said clutch to engage same, air is exhausted from said clutch to release same, and air is exhausted from said brake to re-engage same and bring the machine to a stop at the end of its cycle.

5. In a machine having a clutch and brake, a control assembly therefor comprising means movable in response to operator actuation, a portion of the movement of said means effective to disengage said brake, another portion of the movement of said means effective to establish clutch engagement, movable means operatively connected to said first means, a portion of the movement of said last named means effective to maintain the clutch engagement established by said first named means, another portion of said movement of said last named means effective to disengage said clutch and apply said brake to complete an operative cycle of said machine by exclusive successive action of said clutch and brake.

6. In combination, a machine having a reciprocating header slide and crankshaft to actuate same, a flywheel rotatably mounted on said shaft and a prime mover for same, an air clutch arranged intermediate said flywheel and shaft to transmit flywheel rotation to said shaft, an air brake operatively connected to said shaft to restrain rotation of same, a control assembly to actuate and coordinate the clutch and brake action comprising an air pressure supply, a chambered valve mechanism, a conduit leading from said air supply to said mechanism, an air plunger, a rocker arm operatively connected to said mechanism and said plunger, a conduit having a treadle valve therein leading to said air plunger, means operatively connected to said shaft and to said rocker arm, said treadle effective upon manual actuation to direct air from said supply to said plunger and through said rocker arm admit air from said chambered mechanism to said brake to release same, said rocker arm being further moved by said treadle actuation to admit air from said chambered mechanism to said clutch and establish same, said last named means moving in response to clutch engagement to maintain said last named position of said rocker arm and thereby maintain said clutch engagement substantially throughout a cycle of the machine, said last named means subsequently operative to change said rocker arm position and thereby disengage said clutch and re-apply said brake to bring the machine to a stop at the end of its cycle.

7. In a machine having a driven shaft and a prime mover, a fluid pressure operated friction clutch arranged intermediate the prime mover and said driven shaft, a fluid pressure operated friction brake actuable to restrain the rotation of said shaft, means operating in timed relation to said shaft operatively connected to said clutch and brake to maintain clutch engagement during the major portion of the cycle and to successively disengage said clutch and apply said brake at the end of the machine cycle, said means being manually movable to effect a release of said brake and immediately thereafter to engage said clutch to initiate a machine cycle.

8. In a machine having a prime mover and a driven shaft, a friction clutch arranged intermediate the prime mover and the driven shaft, a friction brake actuable to restrain the rotation of said shaft, means operatively connected to said clutch, a second means operatively connected to said brake, said first and second means timed independently with respect to each other to automatically actuate said clutch and brake independently of each other throughout each cycle of the machine.

9. Fluid controlled clutch and brake mechanism for presses or other machines comprising a clutch having driving and driven parts, a pneumatic motor for operating said clutch, a brake, a pneumatic motor for operating said brake, the relative arrangement and operation of the motors being such that the brake-motor acts to release the brake before the clutch-motor acts to engage the driving and driven parts of the clutch, means for conducting motive-fluid to said brake motor and to said clutch motor, and automatic control means for admitting motive-fluid to the clutch-motor in quick succession to its admission to the brake motor.

10. In combination with an intermittently operated machine having a shaft to be driven, a continuously rotating driving member, a fluid actuated friction clutch to couple said driving member with said driven shaft, a supply of fluid under pressure, a clutch valve arranged to control the admission of fluid from said supply to said clutch, a fluid actuated piston, a manually controlled valve arranged to admit fluid from said supply to said piston to move the same rapidly to the end of its stroke at a rate independent of the rate of opening of said manual valve, said piston being operatively connected to said clutch valve to open the same substantially instantaneously near the end of the stroke of the piston and to maintain said clutch valve in full open position while fluid pressure remains on said piston.

11. In combination with an intermittently operated machine having a shaft to be driven, a continuously rotating driving member, a fluid actuated friction clutch to couple said driving member with said driven shaft, a supply of fluid pressure, a clutch valve for controlling the admission of pressure fluid from said supply to said clutch, an actuating cylinder having a piston operatively connected with said clutch valve, and a manually controlled valve arranged to admit pressure fluid from said supply to said actuating cylinder to move said piston in a direction to open said clutch valve, the forces exerted on said piston being independent of the presence or absence of fluid pressure in said clutch.

12. In combination with an intermittently operated machine having a driven shaft, a driving member, a fluid actuated friction clutch to couple said driving member to said driven shaft, a supply of fluid under pressure, a valve for admitting fluid from said supply to said clutch, means normally urging said valve to closed position, manually controlled means for opening said valve to admit fluid from said supply to said clutch, cam means movable in timed relation to said driven shaft operating to hold said valve in open position while said manually controlled means is released and to permit said valve to close under the influence of said first named means at the end of a cycle of the machine.

13. In an intermittently operated machine having a shaft to be driven, a rotating driving member, a fluid actuated friction clutch to couple said driving member with said driven shaft, a source of supply of pressure fluid, a fluid operated friction brake actuable to restrain the rotation of said driven shaft, a clutch valve arranged to control communication between said source of pressure fluid and said clutch, a brake valve arranged to control communication between said source of pressure fluid and said brake, a movable control member operatively connected to both of said valves, said member being arranged when moved in one direction to first operate said brake valve to release the brake from said driven shaft and thereafter operate said clutch valve to engage the clutch and couple said driving member to said driven shaft, and when moved in the opposite direction to first operate the clutch valve to release the clutch and thereafter operate the brake valve to engage the brake and restrain rotation of said driven shaft, manually controlled means to move said member in said one direction and means operating in timed relation to said driven shaft to move said member in said opposite direction.

14. In an intermittently operated machine having a shaft to be driven, a rotating driving member, a fluid actuated friction clutch to couple said driving member with said driven shaft, a source of supply of pressure fluid, a fluid operated friction brake actuable to restrain the rotation of said driven shaft, a clutch valve arranged to control communication between said source of pressure fluid and said clutch, a brake valve arranged to control communication between said source of pressure fluid and said brake, a movable control member operatively connected to both of said valves, said member being arranged when moved in one direction to first operate said brake valve to release the brake from said driven shaft and thereafter operate said clutch valve to engage the clutch and couple said driving member to said driven shaft, and when moved in the opposite direction to first operate the clutch valve to release the clutch and thereafter operate the brake valve to engage the brake and restrain rotation of said driven shaft, a fluid operated cylinder connected to said member, a manually controlled valve for admitting pressure fluid to said cylinder to move said member in said one direction and means operating in timed relation to said driven shaft to move said member in said opposite direction.

WILLIAM L. CLOUSE.